(12) United States Patent
Nakanishi et al.

(10) Patent No.: US 8,803,830 B2
(45) Date of Patent: Aug. 12, 2014

(54) TOUCH PANEL WITH CONDUCTIVE LAYERS FORMED OF PARALLEL STRIPS

(75) Inventors: Akira Nakanishi, Osaka (JP); Nobuhiro Yamaue, Osaka (JP); Toshiharu Fukui, Nara (JP)

(73) Assignee: Panasonic Corporation, Osaka (JP)

( * ) Notice: Subject to any disclaimer, the term of this patent is extended or adjusted under 35 U.S.C. 154(b) by 219 days.

(21) Appl. No.: 13/379,076

(22) PCT Filed: Jun. 28, 2010

(86) PCT No.: PCT/JP2010/004261
§ 371 (c)(1),
(2), (4) Date: Dec. 19, 2011

(87) PCT Pub. No.: WO2011/001655
PCT Pub. Date: Jan. 6, 2011

(65) Prior Publication Data
US 2012/0098779 A1 Apr. 26, 2012

(30) Foreign Application Priority Data
Jul. 1, 2009 (JP) ................................. 2009-156698

(51) Int. Cl.
*G06F 3/041* (2006.01)
*G06F 3/047* (2006.01)

(52) U.S. Cl.
CPC ................. *G06F 3/047* (2013.01); *G06F 3/041* (2013.01)
USPC ........... 345/173; 345/174; 345/176; 200/512; 178/18.03; 178/18.05; 178/18.06

(58) Field of Classification Search
CPC ....... G06F 3/045; G06F 3/041; G06F 3/0412; G06F 1/13338; H05K 3/361

USPC ........... 345/173, 174, 176; 178/18.01, 18.03, 178/18.05, 18.06; 200/512
See application file for complete search history.

(56) References Cited

U.S. PATENT DOCUMENTS 5,159,159 A * 10/1992 Asher ......................... 178/18.05
5,181,030 A 1/1993 Itaya et al.
(Continued)

FOREIGN PATENT DOCUMENTS

| CN | 201117002 | 9/2008 |
|---|---|---|
| CN | 101446881 | 6/2009 |

(Continued)

OTHER PUBLICATIONS

Ikeda et al., JP 2005-070821 A machine translation, Mar. 17, 2005.*

(Continued)

*Primary Examiner* — Lun-Yi Lao
*Assistant Examiner* — Peter D McLoone
(74) *Attorney, Agent, or Firm* — Wenderoth, Lind & Ponack, L.L.P.

(57) ABSTRACT

A touch panel includes a first substrate having a first conductive layer on one surface; a second substrate having a second conductive layer on a surface on a side facing the first conductive layer; a plurality of first electrodes extending from the first conductive layer; and a plurality of second electrodes extending from the second conductive layer. The first conductive layer is formed of a plurality of parallel strips; and the plurality of first electrodes are formed of a straight portion extending in a predetermined direction, and an inclined portion coupled to the straight portion by being inclined by a predetermined angle with respect to a direction orthogonal to the straight portion. Fading, thickness variation and the like at the time of printing can be prevented and fine patterning can be easily carried out, so that an inexpensive touch panel in which overall miniaturization is achieved can be obtained.

12 Claims, 9 Drawing Sheets

(56) References Cited

U.S. PATENT DOCUMENTS

| | | | |
|---|---|---|---|
| 5,518,078 A * | 5/1996 | Tsujioka et al. | 178/18.05 |
| 6,633,279 B1 * | 10/2003 | Kono et al. | 345/173 |
| 6,781,642 B2 * | 8/2004 | Nakanishi et al. | 349/12 |
| 6,909,425 B2 * | 6/2005 | Matsuda et al. | 345/173 |
| 7,064,748 B2 * | 6/2006 | Cok | 345/173 |
| 7,161,588 B2 * | 1/2007 | Nakanishi et al. | 345/173 |
| 7,427,982 B2 * | 9/2008 | Fujii et al. | 345/173 |
| 7,439,466 B2 * | 10/2008 | Yamaue et al. | 200/512 |
| 7,538,287 B2 * | 5/2009 | Fujii et al. | 200/512 |
| 7,538,831 B2 * | 5/2009 | Nakanishi et al. | 349/58 |
| 7,679,608 B2 * | 3/2010 | Murakami et al. | 345/173 |
| 7,746,662 B2 * | 6/2010 | Nakanishi et al. | 361/782 |
| 8,049,127 B2 * | 11/2011 | Yamaue et al. | 200/512 |
| 8,223,135 B2 * | 7/2012 | Hayashi | 345/174 |
| 8,598,896 B2 * | 12/2013 | Kurashima | 324/686 |
| 8,704,795 B2 * | 4/2014 | Nozawa | 345/174 |
| 2003/0011575 A1 * | 1/2003 | Matsuda et al. | 345/173 |
| 2003/0197813 A1 * | 10/2003 | Nakanishi et al. | 349/12 |
| 2004/0017363 A1 * | 1/2004 | Nakanishi et al. | 345/173 |
| 2004/0178006 A1 * | 9/2004 | Cok | 178/18.01 |
| 2005/0046622 A1 * | 3/2005 | Nakanishi et al. | 345/173 |
| 2005/0078094 A1 * | 4/2005 | Fujii et al. | 345/173 |
| 2005/0099402 A1 * | 5/2005 | Nakanishi et al. | 345/173 |
| 2005/0179668 A1 | 8/2005 | Edwards | |
| 2006/0012539 A1 * | 1/2006 | Matsuhira et al. | 345/1.1 |
| 2006/0132466 A1 * | 6/2006 | Murakami et al. | 345/176 |
| 2007/0128948 A1 * | 6/2007 | Nakanishi et al. | 439/660 |
| 2007/0139393 A1 * | 6/2007 | Nakanishi et al. | 345/173 |
| 2007/0267285 A1 | 11/2007 | Yamaue et al. | |
| 2008/0088601 A1 * | 4/2008 | Chien | 345/173 |
| 2008/0237019 A1 * | 10/2008 | Fujii et al. | 200/512 |
| 2009/0134001 A1 * | 5/2009 | Yamaue et al. | 200/512 |
| 2009/0189872 A1 * | 7/2009 | Hayashi | 345/173 |
| 2009/0284487 A1 * | 11/2009 | Nakanishi et al. | 345/173 |
| 2010/0053114 A1 * | 3/2010 | Kaigawa | 345/174 |
| 2010/0156826 A1 * | 6/2010 | Itaya et al. | 345/173 |
| 2011/0007011 A1 * | 1/2011 | Mozdzyn | 345/173 |
| 2011/0012865 A1 * | 1/2011 | Nozawa | 345/174 |
| 2011/0140720 A1 * | 6/2011 | Kurashima | 324/686 |
| 2011/0199330 A1 * | 8/2011 | Hsu et al. | 345/174 |
| 2011/0285655 A1 * | 11/2011 | Nakanishi et al. | 345/173 |

FOREIGN PATENT DOCUMENTS

| | | |
|---|---|---|
| CN | 101464743 | 6/2009 |
| CN | 101464760 | 6/2009 |
| EP | 1 846 812 | 10/2007 |
| JP | 3-121438 | 12/1991 |
| JP | 10-091349 | 4/1998 |
| JP | 2005-070821 | 3/2005 |
| JP | 2005-523496 | 8/2005 |
| JP | 2007-310440 | 11/2007 |
| WO | 2006/075121 | 7/2006 |

OTHER PUBLICATIONS

International Search Report issued Sep. 28, 2010 in International (PCT) Application No. PCT/JP2010/004261.

Chinese Office Action issued Feb. 8, 2014 in corresponding Chinese application (in English).

* cited by examiner

TOUCH PANEL WITH CONDUCTIVE LAYERS FORMED OF PARALLEL STRIPS

RELATED APPLICATIONS

This application is the U.S. National Phase under 35 U.S.C. §371 of International Application No. PCT/JP2010/004261, filed on Jun. 28, 2010, which in turn claims the benefit of Japanese Application No. 2009-156698, filed on Jul. 1, 2009.

TECHNICAL FIELD

The present invention relates to a touch panel mainly used to operate various types of electronic devices.

BACKGROUND ART

In recent years, with higher function and diversification of various types of electronic devices such as portable telephones and electronic cameras, use of such devices in which a light-transmissive touch panel is attached to a front surface of a display element such as a liquid crystal display element and the touch panel is pressed with a finger or a pen while looking at the display of the display element on the rear surface through the touch panel to switch among various functions of the device is increasing, where a touch panel that is inexpensive and that enables various operations is desired.

Such a conventional touch panel will be described with reference to FIGS. 7 to 9C. In the drawings, the dimension is shown in a partially enlarged manner to facilitate the understanding of the configuration.

FIG. 7 is a cross-sectional view of a conventional touch panel. FIG. 8 is an exploded perspective view of the conventional touch panel. In FIGS. 7 and 8, the touch panel includes upper substrate 1, upper conductive layer 2, a pair of upper electrodes 3A, 3B, lower substrate 4, lower conductive layers 5, lower electrodes 6, spacer 7, and wiring substrate 8. Upper substrate 1 has a film shape and has a light transmitting property. Upper conductive layer 2 is formed to a substantially rectangular shape over substantially the entire surface of the lower surface of upper substrate 1. Upper conductive layer 2 is made of indium tin oxide, for example and has a light transmitting property. A pair of upper electrodes 3A and 3B are formed at a front end and a back end of upper conductive layer 2. The ends of upper electrodes 3A and 3B are extended to the front end of upper substrate 1.

Lower substrate 4 has a film shape or a plate shape, and has a light transmitting property. The plurality of lower conductive layers 5 are formed to a substantially strip form on the upper surface of lower substrate 4. The plurality of lower conductive layers 5 are made of indium tin oxide, for example and have a light transmitting property. A plurality of dot spacers (not shown) are arranged at predetermined intervals on the upper surfaces of lower conductive layers 5. Lower electrode 6 is formed at the front end of each lower conductive layer 5. An end of lower electrode 6 is formed to extent to the front end of lower substrate 4.

Spacer 7 is formed at the inner edge of the outer periphery between upper substrate 1 and lower substrate 4. Spacer 7 is formed to a substantially frame shape. Spacer 7 is formed by applying an adhesive (not shown) on upper and lower surfaces or on one surface to laminate the outer peripheries of upper substrate 1 and lower substrate 4. Upper conductive layer 2 and lower conductive layer 5 thereby face each other across a predetermine gap.

Furthermore, wiring substrate 8 has a film shape, where a plurality of wiring patterns (not shown) are formed on the upper and lower surfaces. Wiring substrate 8 has the back end sandwiched between the front end of upper substrate 1 and the front end of lower substrate 4. The back end of each wiring pattern of wiring substrate 8 is adhered and connected to the ends of upper electrodes 3A and 3B and the plurality of lower electrodes 6 with an anisotropically conductive adhesive (not shown) in which conductive particles are dispersed within the synthetic resin. The touch panel is configured in such a manner.

The touch panel configured in such a manner is arranged on the front surface of the display element such as a liquid crystal display element, and is attached to the electronic device. In this case, the pair of upper electrodes 3A and 3B and the plurality of lower electrodes 6 are electrically connected to an electronic circuit (not shown) of the electronic device through the plurality of wiring patterns of wiring substrate 8.

In the above configuration, when the area of arrow A at the upper surface of upper substrate 1 shown in FIG. 7 is pressed with a finger or a pen, for example, according to the display of the display element at the rear surface of the touch panel, upper substrate 1 bends and upper conductive layer 2 at the pressed area is brought into contact with lower conductive layer 5A.

In this case, a voltage is applied to both ends of upper conductive layer 2 through the plurality of wiring patterns of wiring substrate 8 from the electronic circuit. For instance, if a voltage of 5V is applied between upper electrodes 3A and 3B, a voltage of 2V is detected from lower conductive layer 5A and hence the position in the front and back direction of arrow A is detected by the electronic circuit by such a voltage.

At the same time, lower conductive layer 5A, from which the voltage is detected, is the third from the right in the plurality of lower conductive layers 5, for example, so that the position in the left and right direction of arrow A is detected by the electronic circuit. Therefore, the pressed position in the front and back direction and the left and right direction is detected by the electronic circuit, and switching of various functions of the device is carried out.

That is, if the upper surface of upper substrate 1 on a desired menu, for example the area of arrow A is pressed with a plurality of menus and the like displayed on the display element at the rear surface of the touch panel, the electronic circuit detects the pressed position in the front and back direction by the voltage detected from lower conductive layer 5A. The electronic circuit detects the pressed position in the left and right direction by lower conductive layer 5A of some order. Therefore, the selection of the desired menu that is pressed can be carried out from the plurality of menus.

In order to produce upper substrate 1 and lower substrate 4, for example, lower substrate 4, lower conductive layer 5 of thin film of indium tin oxide and the like is generally formed over the entire surface of the upper surface of lower substrate 4 through a sputtering method and the like as shown in a plan view of FIG. 9A.

The etching process is then carried out to remove the thin film of indium tin oxide in the unnecessary areas, so that a plurality of lower conductive layers 5 are formed to a substantially strip form on the upper surface of lower substrate 4, as shown in FIG. 9B.

Thereafter, the plurality of lower electrodes 6 made of silver, carbon, or the like extending from the front ends of lower conductive layers 5 to the front end of lower substrate 4 are formed, as shown in FIG. 9C, through screen printing, so that lower substrate 4 in which the plurality of lower conductive layers 5 and lower electrodes 6 are formed on the upper surface is completed.

As shown in FIG. 9C, the plurality of lower electrodes 6 are normally formed by straight portions 6A and 6B, which extend in a direction parallel to substantially strip-shaped lower conductive layer 5, and bent portion 6D coupled to straight portions 6A and 6B through arcuate portion 6C orthogonal thereto.

When forming such lower electrode 6 by screen printing, if the direction of screen printing is the direction of arrow B, straight portions 6A and 6B in the direction parallel thereto are subjected to a relatively satisfactory printing, but fading and blur, thickness variation and the like easily occur in bent portion 6D and arcuate portion 6C orthogonal thereto.

Therefore, bent portion 6D orthogonal to the direction of screen printing typically has the width made large to a certain extent compared to straight portion 6A and 6B to prevent such drawbacks.

For example, Unexamined Japanese Patent Publication No. 2007-310440 is known for citation list information related to the invention of this application.

However, in the conventional touch panel described above, the width of bent portion 6D and the like orthogonal to straight portions 6A and 6B of lower electrode 6 need to be formed large to a certain extent to prevent fading and blur, thickness variation, and the like at the time of screen printing of lower electrode 6 when producing lower substrate 4 formed with the plurality of lower conductive layers 5 and lower electrode 6. Thus, a so-called fine patterning in which the width and the gap of the plurality of lower electrodes 6 are reduced becomes difficult to carry out, and overall miniaturization becomes difficult to achieve.

SUMMARY OF THE INVENTION

The present invention provides a touch panel that can be further miniaturized. A touch panel according to the present invention includes a first substrate with a first conductive layer on one side; a second substrate having a second conductive layer on a surface facing the first conductive layer; a plurality of first electrodes extending from the first conductive layer; and a plurality of second electrodes extending from the second conductive layer. The first conductive layer is formed of a plurality of parallel strips, and the plurality of first electrodes are each formed of a straight portion extending in a predetermined direction and an inclined portion inclined by a predetermined angle with respect to the direction orthogonal to the straight portion to be coupled to the straight portion. The fading, thickness variation and the like at the time of printing thus become less likely to occur, and the fine patterning can be easily carried out. As a result, the overall touch panel can be miniaturized.

Therefore, according to the present invention, an advantageous effect of realizing a touch panel in which miniaturization can be achieved and in which various operations can be made is obtained.

DESCRIPTION OF EMBODIMENTS

Figure 1:
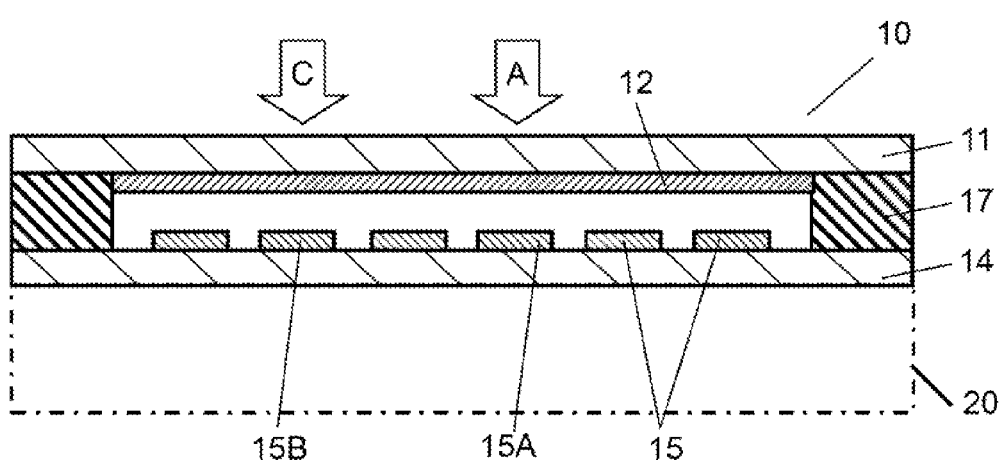
FIG. 1 is a cross-sectional view of a touch panel according to a first exemplary embodiment of the present invention.

Hereinafter, embodiments of the present invention will be described with reference to FIGS. 1 to 6. In the drawings, the dimension is shown in a partially enlarged manner to facilitate the understanding of the configuration.

First Exemplary Embodiment

Figure 2:
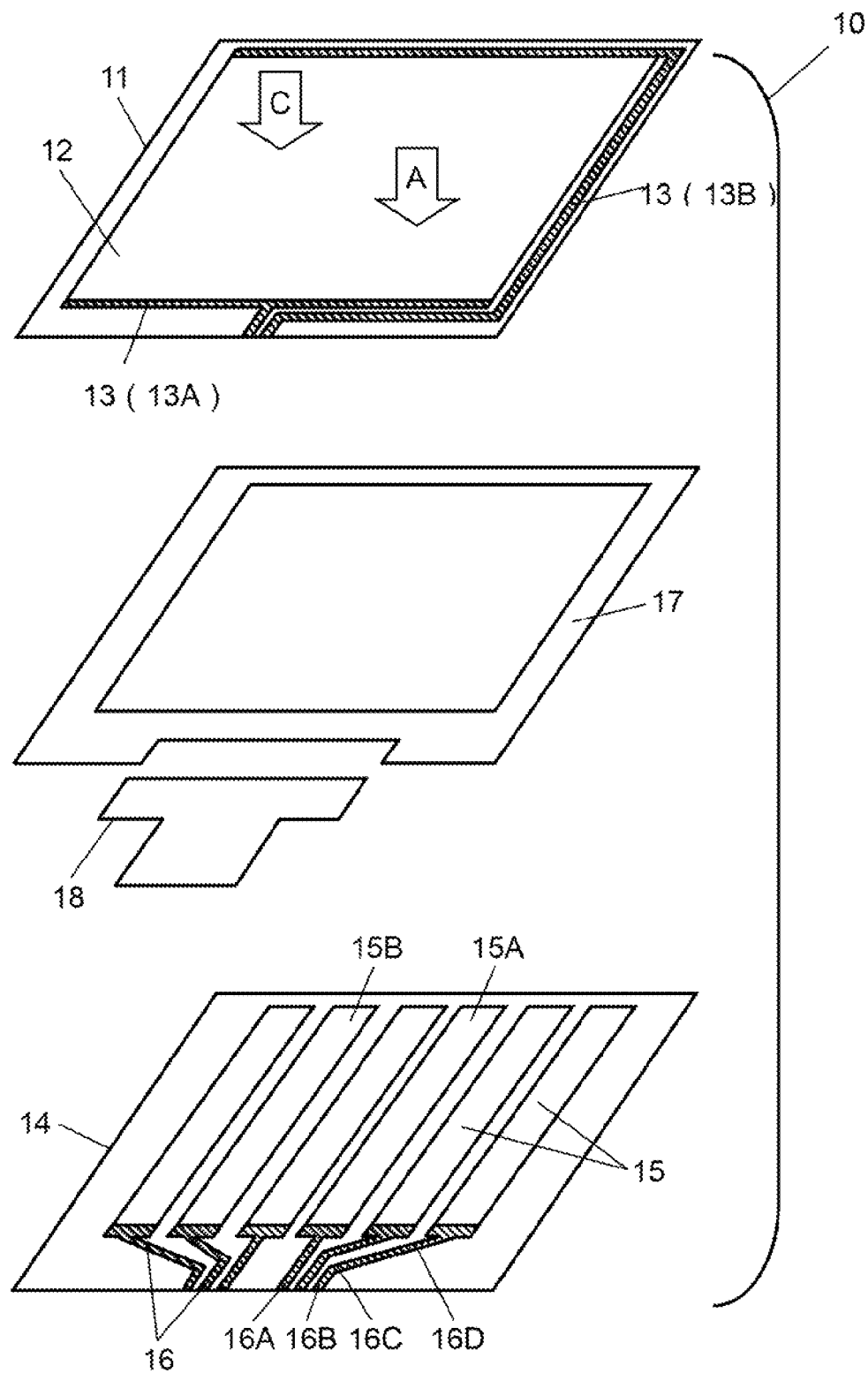
FIG. 2 is an exploded perspective view of the touch panel according to the first exemplary embodiment of the present invention.

FIG. 1 is a cross-sectional view of a touch panel according to a first exemplary embodiment of the present invention. FIG. 2 is an exploded perspective view in the first exemplary embodiment of the present invention. In FIGS. 1 and 2, touch panel 10 of this exemplary embodiment includes lower substrate 14, which is a first substrate, lower conductive layer 15, which is a first conductive layer, upper substrate 11, which is a second substrate, upper conductive layer 12, which is a second conductive layer, spacer 17, lower electrode 16, which is a first electrode, upper electrode 13, which is a second electrode, and wiring substrate 18.

Upper substrate 11 has a film shape and is made of polyethylene terephthalate, polyether sulfone, polycarbonate, or the like. Upper substrate 11 has a light transmitting property. Upper conductive layer 12 is formed into a substantially rectangular shape over substantially the entire surface of one surface (lower surface in FIG. 2) of upper substrate 11. Upper conductive layer 12 is made of indium tin oxide, tin oxide, or the like and has a light transmitting property. Upper conductive layer 12 is formed by a sputtering method, and the like. A plurality of upper electrodes 13A, 13B are formed at a front end and a back end of upper conducive layer 12 as upper electrode 13. Upper electrode 13A and upper electrode 13B are made of silver, carbon, or the like. The ends of upper electrode 13A and upper electrode 13B are extended to one end of a first side of upper substrate 11.

Lower substrate 14 is made of glass, acryl, polycarbonate, or the like and formed into a plate shape or a film shape. Lower substrate 14 has a light transmitting property. The plurality of substantially strip-shaped lower conductive layers 15 having a width of around 0.3 mm to 2 mm are formed on one side (upper surface in FIG. 2) of lower substrate 14. Lower conductive layers 15 are made of indium tin oxide, tin oxide, or the like and are formed in parallel at an interval of around 0.6 mm to 4 mm by the sputtering method and the like. Lower conductive layers 15 have a light transmitting property.

A plurality of dot spacers (not shown) are arranged at predetermined intervals by an insulating resin such as epoxy and silicone on the upper surface of lower conductive layers 15. Lower electrode 16 is formed at one end (front end in FIG. 2) of each lower conductive layer 15. When referring to one end of lower conductive layer 15, this means one end on the same side as the first side of upper conductive layer 12. Lower electrode 16 has one end extending to the front end of lower substrate 14. Lower electrode 16 is made of silver, carbon, or the like, where the width of each lower electrode 16 is to be smaller than or equal to 0.15 mm and the gap between lower electrodes 16 is to be smaller than or equal to 0.15 mm. Therefore, lower electrode 16 is formed in a so-called fine patterned state in which the width and the gap are small.

As shown in FIG. 2, lower electrode 16 includes straight portions 16A and 16B which are first straight portions extending in a direction parallel to the substantially strip-shaped lower conductive layer 15, and inclined portion 16D which is a first inclined portion formed inclined at a predetermined inclination angle, for example, an inclination angle of greater than or equal to 15 degrees with respect to the direction orthogonal to straight portions 16A and 16B. Straight portion 16A and straight portion 16B are coupled with inclined portion 16D by arcuate portion 16C.

Spacer 17 is formed to a substantially frame shape on an inner edge of the outer periphery between upper substrate 11 and lower substrate 14 using polyester, epoxy, nonwoven cloth, or the like. The outer peripheries of upper substrate 11 and lower substrate 14 are laminated with an adhesive (not shown) such as acryl or rubber applied to both sides (upper and lower surfaces of FIG. 2) or one side of spacer 17. Upper conductive layer 12 and the plurality of lower conductive layers 15 face each other across a predetermined gap.

Wiring substrate 18 is formed to a film shape using polyimide, polyethylene terephthalate, or the like. A plurality of wiring patterns (not shown) of copper foil, silver, carbon, or the like are formed on both sides (upper and lower surfaces in FIG. 2) of wiring substrate 18. One end (back end in FIG. 2) of wiring substrate 18 is sandwiched between the front end of upper substrate 11 and the front end of lower substrate 14. One end (back end) of each wiring pattern of wiring substrate 18 is adhesively connected to the ends of upper electrodes 13A, 13B and the plurality of lower electrodes 16 by an anisotropic conductive adhesive (not shown). The anisotropic conductive adhesive is formed by dispersing a plurality of conductive particles in which gold plating is performed on nickel, resin or the like in a synthetic resin such as epoxy, acryl, or polyester. The touch panel is configured in the above manner.

Upper substrate 11 and lower substrate 14 of such a touch panel are produced in the following manner. For instance, when producing lower substrate 14, lower conductive layer 15 of thin film of indium tin oxide and the like is generally formed over the entire surface of the upper surface of lower substrate 14 through the sputtering method and the like as shown in a plan view of FIG. 3A.

Figure 3A:
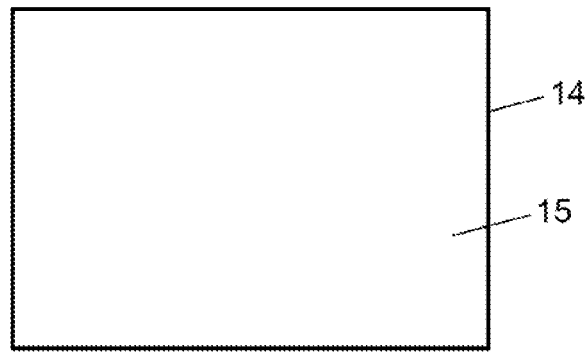
FIG. 3A is a plan view of the touch panel according to the first exemplary embodiment of the present invention.
Figure 3B:
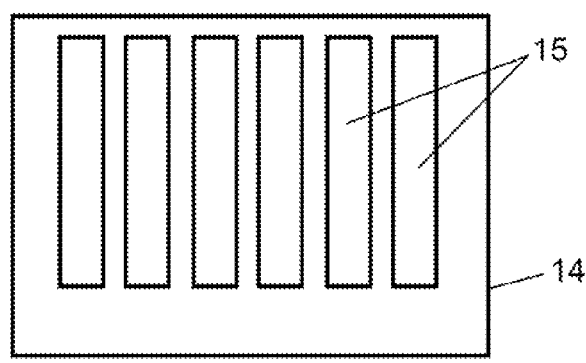
FIG. 3B is a plan view of the touch panel according to the first exemplary embodiment of the present invention.

The etching process is then carried out to remove the thin film of indium tin oxide in the unnecessary areas, so that a plurality of lower conductive layers 15 are formed to a substantially strip form on the upper surface of lower substrate 14, as shown in FIG. 3B.

Figure 3C:
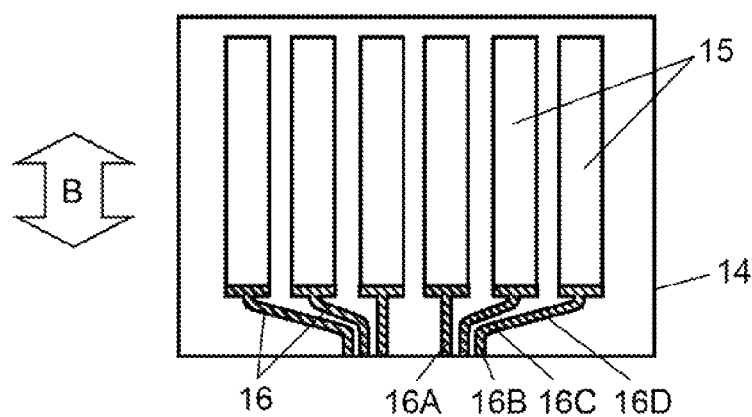
FIG. 3C is a plan view of the touch panel according to the first exemplary embodiment of the present invention.

Thereafter, the plurality of lower electrodes 16 made of silver, carbon, or the like extending from the front end of lower conductive layer 15 to the front end of lower substrate 14 are formed, as shown in FIG. 3C, through screen printing. In this manner, lower substrate 14 in which the plurality of lower conductive layers 15 and lower electrodes 16 are formed on the upper surface is completed.

When forming lower electrode 16 by screen printing as described above, if the direction of screen printing is the direction of arrow B, as shown in FIG. 3C, straight portions 16A and 16B in the direction parallel thereto are relatively satisfactorily performed with printing. However, fading, blur and thickness variation easily occur in the portion formed in the direction not parallel to the direction of arrow B but orthogonal to straight portions 16A and 16B, in particular.

In this exemplary embodiment, however, inclined portion 16D is not orthogonal with respect to straight portions 16A and 16B but is coupled to straight portions 16A, 16B by being inclined at a predetermined inclination angle, for example, inclination angle of greater than or equal to 15 degrees with respect to the orthogonal direction, as described above. Drawbacks such as fading, blur, and thickness variation at the time of printing are less likely to occur by forming inclined portion 16D. Thus, the fine patterning in which the width and the gap of the plurality of lower electrodes 16 are reduced is easily achieved.

The touch panel configured as above is arranged on the front surface of the display element such as liquid crystal display element 20 and attached to the electronic device, as shown in FIG. 1. The pair of upper electrodes 13A and 13B, and the plurality of lower electrodes 16 are electrically connected to an electronic circuit (not shown) of the electronic device through the plurality of wiring patterns of wiring substrate 18.

According to the above configuration, in the electronic device equipped with the touch panel of this exemplary embodiment, the area of arrow A, for example, at the upper surface of upper substrate 11 is pressed with a finger or a pen, as shown in FIGS. 1 and 2 according to the display of the display element at the rear surface of the touch panel. Upper substrate 11 bends in response to the press operation, and upper conductive layer 12 at the pressed area is brought into contact with lower conductive layer 15A, which is one of the plurality of lower conductive layers 15.

At this time, a voltage is applied to both ends of upper conductive layer 12 through the plurality of wiring patterns of wiring substrate 18, and furthermore, through upper electrodes 13A and 13B from the electronic circuit. For instance, if a voltage of 5V is applied between upper electrodes 13A and 13B, a voltage of 2V is detected from lower conductive layer 15A, and hence the position in the front and back direction of the pressed point (arrow A) is detected by the electronic circuit by such a voltage.

At the same time, lower conductive layer 15A, from which the voltage is detected, is the third from the right in the plurality of lower conductive layers 15, for example, so that the position in the left and right direction of the pressed point (arrow A) is detected by the electronic circuit. Therefore, the position of the pressed point in the front and back direction and the left and right direction is detected by the electronic circuit, and switching of various functions of the device is carried out.

That is, if the upper surface of upper substrate 11 on a desired menu, for example the area of arrow A is pressed with a plurality of menus and the like displayed on the display element at the rear surface of the touch panel, the electronic circuit detects the pressed position so that the desired menu that is pressed can be selected from the plurality of menus.

Furthermore, if the area of arrow C is simultaneously pressed with another finger while pressing the area of arrow A, the area corresponding to arrow C of upper substrate 11 also bends and upper conductive layer 12 of the pressed area is brought into contact with lower conductive layer 15B.

In this case, a voltage of 3V is detected from lower conductive layer 15B, so that the position in the front and back direction of arrow C, and furthermore, the position in the left and right direction as lower conductive layer 15B from which the voltage is detected is second from the left in the plurality of lower conductive layers 15 are respectively detected by the electronic circuit by the relevant voltage.

In other words, a plurality of pressed positions such as arrows A and C can be detected so that various operations can be carried out by forming lower conductive layer 15 at the upper surface of lower substrate 14 to a plurality of substantially strip forms.

Drawbacks such as fading, blur, and thickness variation at the time of screen printing can be prevented by forming the plurality of lower electrodes 16 each having a substantially strip form and extending from the ends of the plurality of lower conductive layers 15 by straight portions 16A and 16B extending parallel in a predetermined direction, and inclined portion 16D coupled by being inclined at a predetermined inclination angle such as an inclination angle of greater than or equal to 15 degrees with respect to the direction orthogonal to straight portions 16A and 16B. Thus, the fine patterning in which the width and the gap of the plurality of lower electrodes 16 are reduced can be easily achieved.

That is, the fine patterning of lower electrode 16 can be easily carried out by coupling and forming inclined portion 16D of lower electrode 16 by inclining to greater than or equal to a predetermined angle with respect to the orthogonal direction rather than forming in the direction orthogonal to straight portion 16A and straight portion 16B, so that miniaturization of the touch panel and the overall electronic device using the same can be achieved.

The fading, the thickness variation and the like at the time of printing are less likely to occur the closer the inclination angle with respect to the direction orthogonal to straight portions 16A, 16B of inclined portion 16D is to 90 degrees, that is, the closer inclined portion 16D is parallel to straight portions 16A and 16B. Since it is actually difficult to couple with straight portion 16B at such an angle, it is preferable to form to an inclination angle of greater than or equal to 15 degrees and desirably greater than or equal to 30 degrees and smaller than or equal to 75 degrees.

In the above description, description has been made of forming a touch panel such that lower substrate 14 serving as the first substrate is positioned on the lower side with respect to upper substrate 11 serving as the second substrate, by way of example, but the invention is not limited thereto. In other words, a touch panel may be formed such that lower substrate 14 serving as the second substrate is positioned on the upper side with respect to upper substrate 11 serving as the first substrate, and upper conductive layer 12 and lower conductive layer 15 face each other.

As opposed to this exemplary embodiment, upper conductive layer 12 serving as a second conductive layer formed on upper substrate 11 serving as a second substrate may be formed to a plurality of substantially strip forms, and upper electrode 13 may be formed to include a straight portion that extends parallel in a predetermined direction and an inclined portion that is inclined by a predetermined angle with respect to the direction orthogonal to the straight portion and that is coupled to the straight portion.

According to this exemplary embodiment, a first substrate having a first conductive layer on one side, a second substrate having a second conductive layer on a surface facing the first substrate, a plurality of first electrodes extending from the first conductive layer, and a plurality of second electrodes extending from the second conductive layer are arranged, the first conductive layer being formed of a plurality of parallel strips, and the plurality of first electrodes being formed of a straight portion that extends in a predetermined direction and an inclined portion that is inclined by a predetermined angle with respect to the direction orthogonal to the straight portion and that is coupled to the straight portion, so that fading and thickness variation at the time of printing can be prevented, fine patterning can be easily carried out, overall miniaturization can be achieved, and an inexpensive touch panel can be obtained.

Second Exemplary Embodiment

A second exemplary embodiment of the present invention will be hereinafter described. The same reference numerals are denoted on the portions of the same configuration as the configuration of the first exemplary embodiment, and the detailed description will be omitted.

Figure 4:
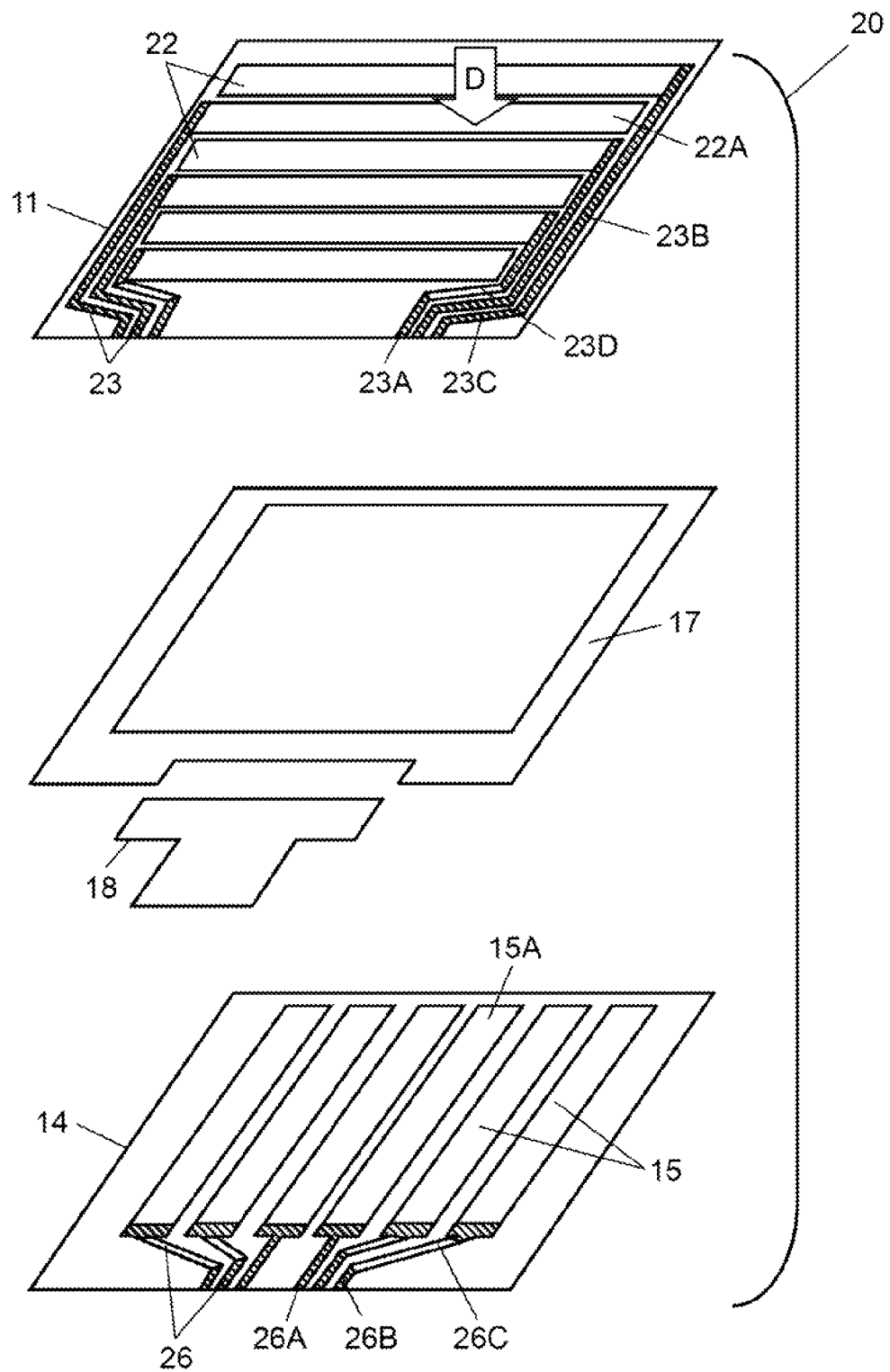
FIG. 4 is an exploded perspective view of a touch panel according to a second exemplary embodiment of the present invention.

FIG. 4 is an exploded perspective view of a touch panel according to the second exemplary embodiment of the present invention. In FIG. 4, upper substrate 11 serving as the second substrate has a film shape and has a light transmitting property. A plurality of upper conductive layers 22, which are second conductive layers, each having a substantially strip form and having a light transmitting property are formed at predetermined intervals on a lower surface of one side (FIG. 4) of upper substrate 11. A plurality of upper electrodes 23, which are second electrodes, each having the end extending to the front end of upper substrate 11 arranged at the left end and the right end of the plurality of upper conductive layers 22.

The plurality of upper electrodes 23 are formed of straight portions 23A and 23B serving as second straight portions extending in a direction orthogonal to substantially strip-shaped upper conductive layer 22, and inclined portion 23C serving as a second inclined portion coupled by being inclined at a predetermined inclination angle such as an inclination angle of greater than or equal to 15 degrees with respect to the direction orthogonal to straight portions 23A, 23B. Upper electrode 23 is formed in a fine patterned state of smaller than or equal to a predetermined width and gap.

Inclined portion 23D serving as the second inclined portion coupled to straight portion 23A on the inner most side is formed by upper conductive layer 22 made of indium tin oxide, tin oxide, and the like.

The plurality of lower conductive layers 15 serving as first conductive layers each having a substantially strip form and having a light transmitting property are formed in parallel at a predetermined interval in the direction orthogonal to upper conductive layer 22 on one side (upper surface in FIG. 4) of lower substrate 14 serving as a first substrate. A plurality of dot spacers (not shown) are arranged at predetermined intervals on the upper surface of lower conductive layers 15. A plurality of lower electrodes 26 serving as the first electrodes each having the end extended to the front end of lower substrate 14 from the front end of lower conductive layer 15 are fine patterned and formed on the upper surface of lower substrate 14.

Lower electrodes 26 are formed of straight portions 26A and 26B serving as the first straight portions extending in a direction parallel to substantially strip-shaped lower conductive layer 15, and inclined portion 26C serving as the first inclined portion coupled by being inclined at a predetermined inclination angle such as an inclination angle of greater than or equal to 15 degrees with respect to the direction orthogonal to straight portions 26A, 26B. Inclined portion 26C is formed by lower conductive layer 15 made of indium tin oxide, tin oxide, and the like.

The outer peripheries of upper substrate 11 and lower substrate 14 are laminated by spacer 17. Thus, the plurality of upper conductive layers 22 and the plurality of lower conductive layers 15 face each other across a predetermined gap. The back end of wiring substrate 18 is sandwiched between the front end of upper substrate 11 and the front end of lower substrate 14. The wiring pattern (not shown) formed on both sides (upper and lower surfaces in FIG. 4) of wiring substrate 18 is adhesively connected to the plurality of upper electrodes 23 and lower electrodes 26. The touch panel is configured in such a manner.

Figure 5A:
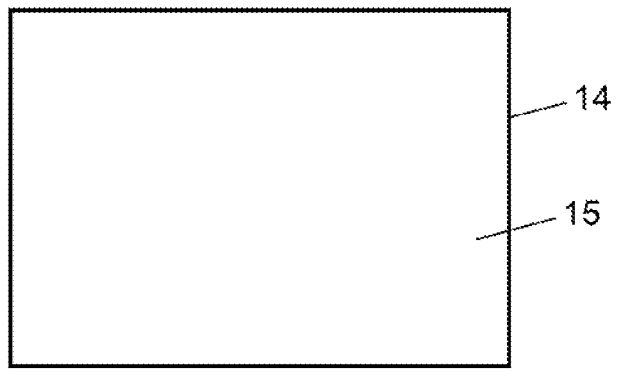
FIG. 5A is a plan view of the touch panel according to the second exemplary embodiment of the present invention.

When producing lower substrate 14, for example, of such a touch panel, lower conductive layer 15 of thin film form of indium tin oxide and the like is first formed over the entire surface of the upper surface of lower substrate 14 through the sputtering method and the like as shown in a plan view of FIG. 5A, similar to the case of the first exemplary embodiment.

Figure 5B:
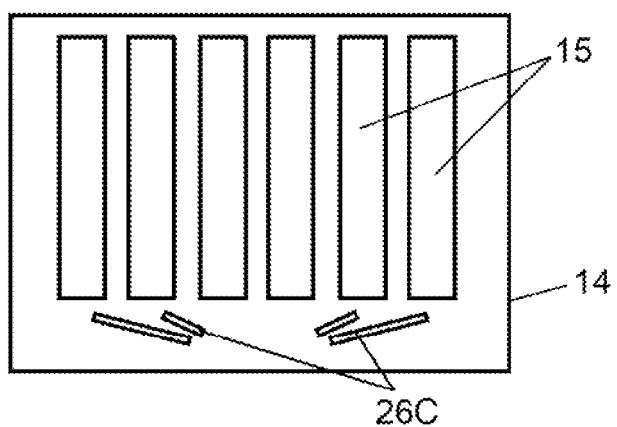
FIG. 5B is a plan view of the touch panel according to the second exemplary embodiment of the present invention.

The etching process is then carried out to remove the thin film of indium tin oxide in the unnecessary areas. A plurality of strip-shaped lower conductive layers 15 and the plurality of inclined portions 26C thereby formed on the upper surface of lower substrate 14, as shown in FIG. 5B.

Figure 5C:
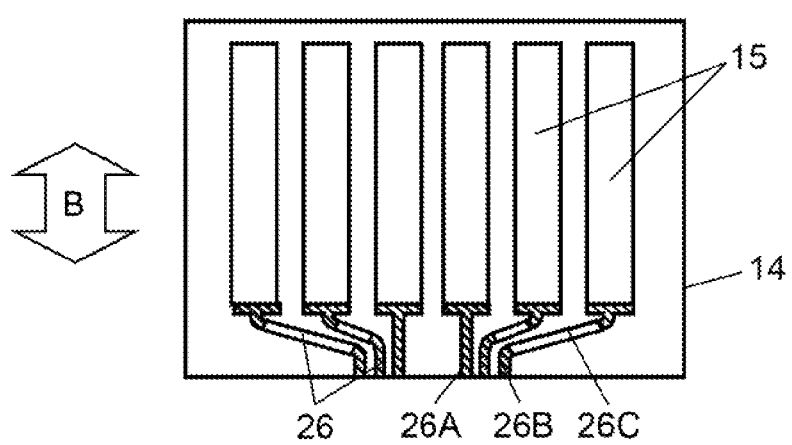
FIG. 5C is a plan view of the touch panel according to the second exemplary embodiment of the present invention.

Thereafter, as shown in FIG. 5C, straight portion 26A made of silver, carbon or the like extending from the front end of lower conductive layer 15 to the front end of lower substrate 14, and straight portion 26B coupled to inclined portion 26C are formed by screen printing and the like, so that lower substrate 14 having the plurality of lower conductive layers 15 and lower electrodes 26 formed on the upper surface is completed.

As shown in FIG. 5C, when forming lower electrode 26 by screen printing, if the direction of screen printing is the direction of arrow B, straight portions 26A and 26B in the direction parallel thereto are subjected to a relatively satisfactory printing. However, fading and blur, thickness variation and the like easily occur in inclined portion 26C if inclined portion 26C not parallel to the direction of arrow B is subjected to screen printing.

In this exemplary embodiment, however, drawbacks such as fading, blur, and thickness variation do not occur even if the inclination angle of inclined portion 26C is large since inclined portion 26C is formed by lower conductive layer 15 and not screen printing.

The touch panel configured in such a manner is arranged on the front surface of the display element such as a liquid crystal display element and attached to the electronic device, and the plurality of upper electrodes 23 and lower electrodes 26 are electrically connected to the electronic circuit (not shown) of the device through a plurality of wiring patterns of wiring substrate 18.

In the above configuration, when the area of arrow D at the upper surface of upper substrate 11 is pressed with a finger or a pen, as shown in FIG. 4, according to the display of the display element at the rear surface of the touch panel, upper substrate 11 bends and upper conductive layer 22A at the pressed area is brought into contact with lower conductive layer 15A.

In this case, a voltage is sequentially applied to upper conductive layer 22 and lower conductive layer 15 through the plurality of wiring patterns of wiring substrate 18 from the electronic circuit, where the pressed position in the front and back direction and the left and right direction of arrow D is detected by the electronic circuit by the voltage from lower conductive layer 15A and upper conductive layer 22A, and switching of various functions of the device is carried out.

That is, if the upper surface of upper substrate 11 on a desired menu, for example the area of arrow D is pressed with a plurality of menus and the like displayed on the display element at the rear surface of the touch panel, the electronic circuit detects the pressed position in the front and back and left and right directions by the voltage detected from lower conductive layer 15A and upper conductive layer 22A, and the selection of the desired menu that is pressed can be carried out from the plurality of menus.

In this case, drawbacks such as fading, blur, and thickness variation at the time of screen printing are prevented, and fine patterning in which the width and the gap are reduced of the plurality of lower electrodes 26 is easily achieved since inclined portion 26C is formed from lower conductive layer 15 and not printing.

In other words, fine patterning of lower electrode 26 can be easily carried out and the overall touch panel can be miniaturized even if the inclination angle of inclined portion 26C is slightly large by forming inclined portion 26C of lower electrode 26 with lower conductive layer 15.

Moreover, inclined portion 23D can be formed on the inner side of the inner periphery of substantially frame shaped spacer 17, that is, the area running out to the operating region to be pressed since inclined portion 23D coupled to straight portion 23A on the inner most side of the plurality of upper electrodes 23 of upper substrate 11 is similarly formed from upper conductive layer 22 and not printing.

That is, inclined portion 23D formed from upper conductive layer 22 has a light transmitting property, where visibility of the display element at the rear surface of the touch panel is not affected even if formed on the inner side of the inner periphery of spacer 17. Therefore, the gap with another inclined portion 23C can be reduced and fine patterning can be easily carried out by forming inclined portion 23D so as to run out to the operating region.

In the above description, a configuration in which only inclined portion 23D of upper electrode 23 on the inner most side is formed with upper conductive layer 22 has been described, but the present invention can be implemented with a configuration in which inclined portion 23C is also formed with upper conductive layer 22.

Inclined portion 26C and inclined portion 23D may be formed by screen printing, similar to the first exemplary embodiment. In this case, facing, thickness variation and the like at the time of printing are less likely to occur the closer the inclination angle with respect to the direction orthogonal to straight portions 23A, 23B of inclined portions 23C, 23D and the inclination angle with respect to the direction orthogonal to straight portions 26A, 26B of inclined portion 26C are to 90 degrees, that is, the closer the inclined portion is parallel to the straight portion. Since it is actually difficult to couple with the straight portion at such an angle, it is preferable to form it to an inclination angle of greater than or equal to 15 degrees and desirably greater than or equal to 30 degrees and smaller than or equal to 75 degrees.

According to this exemplary embodiment, upper conductive layer 22 serving as the second conductive layer is formed to a plurality of parallel strips, and upper electrode 23 serving as a plurality of second electrodes is formed by straight portions 23A, 23B serving as the second straight portions extending in a predetermined direction and inclined portions 23C, 23D serving as the second inclined portions inclined by a predetermined angle with respect to the direction orthogonal to the straight portion and coupled to the second straight portion.

Moreover, inclined portion 26C serving as the first inclined portion may be formed with lower conductive layer 15 serving as the first conductive layer. Similarly, inclined portions 23C, 23D serving as the second inclined portions may be formed with upper conductive layer 22 serving as the second conductive layer.

Thus, even if the inclination angle of inclined portions 23D and 26C is slightly large, fading, thickness variation and the like at the time of printing do not occur, and a touch panel can be obtained in which reliable electrical connection and separation can be carried out, fine patterning of upper electrode 23 and lower electrode 26 can be easily carried out, and overall miniaturization can be achieved.

Third Exemplary Embodiment

Other exemplary embodiments of the present invention will be described using a third exemplary embodiment. The same reference numerals are denoted on the portions of the same configuration as the configuration of the first and second exemplary embodiments, and the detailed description will be omitted.

Figure 6:
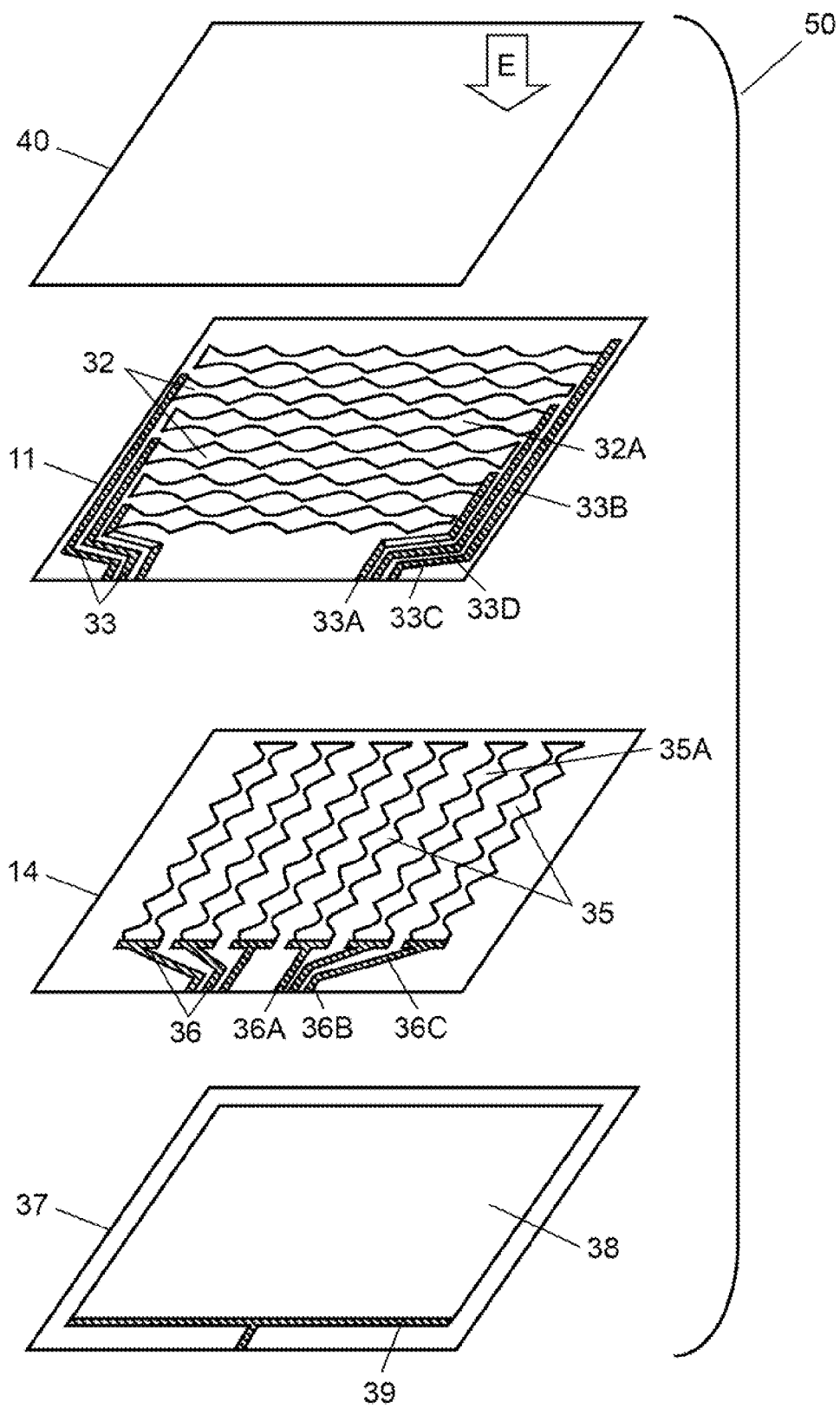
FIG. 6 is an exploded perspective view of a touch panel according to a third exemplary embodiment of the present invention.
Figure 7:
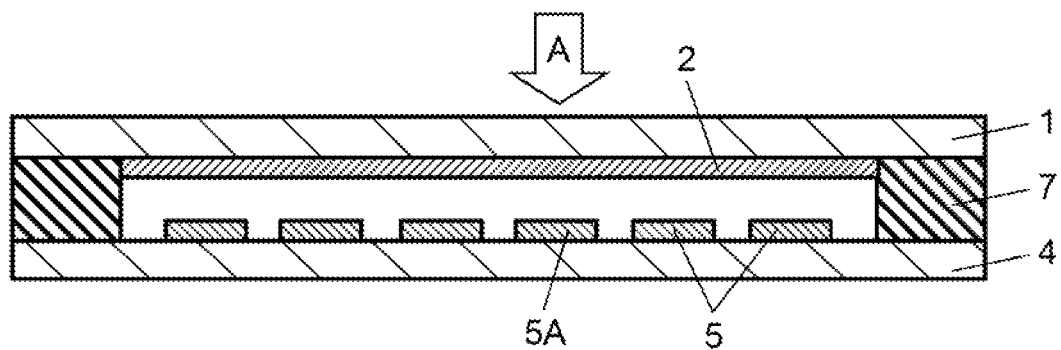
FIG. 7 is a cross-sectional view of a conventional touch panel.
Figure 8:
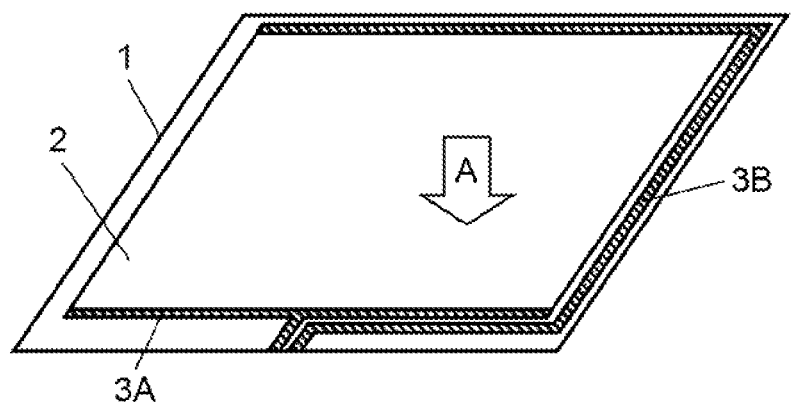
FIG. 8 is an exploded perspective view of the conventional touch panel.
Figure 8:
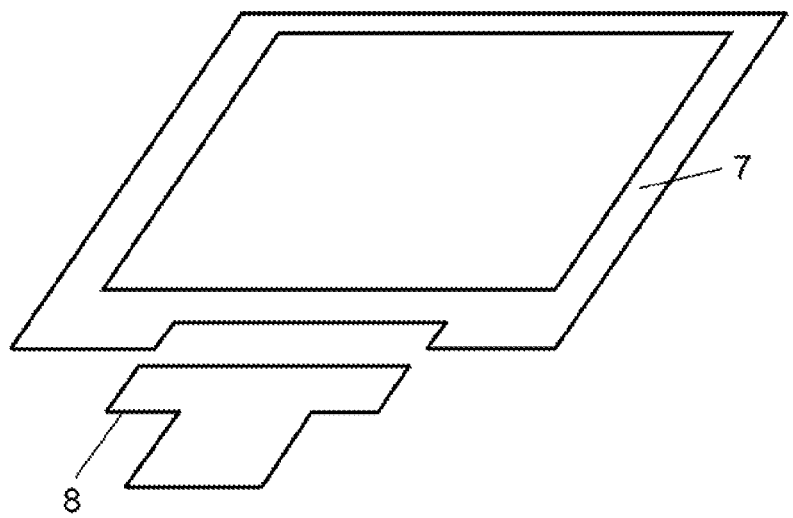
Figure 8:
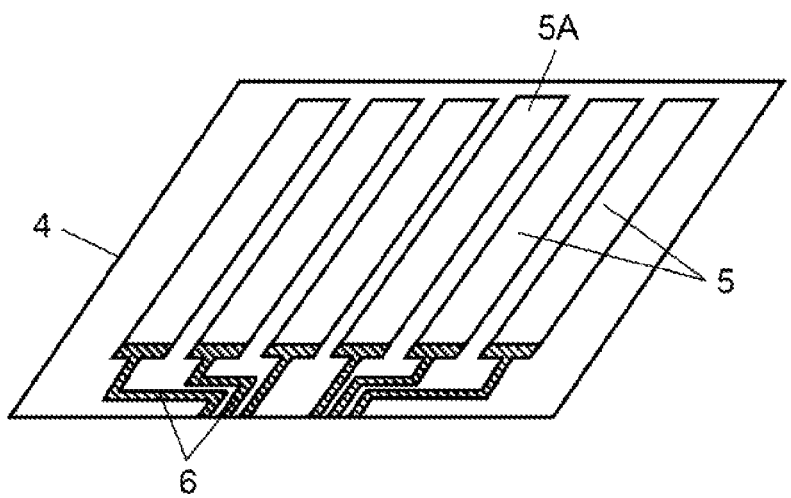
Figure 9A:
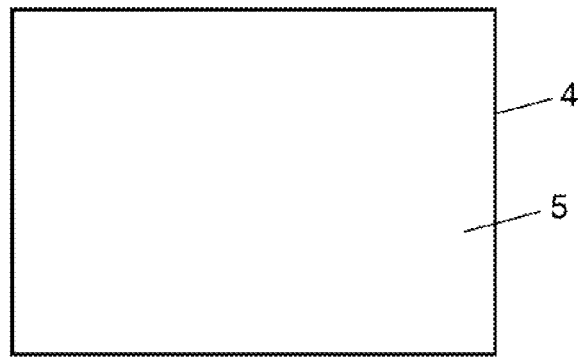
FIG. 9A is a plan view of the conventional touch panel.
Figure 9B:
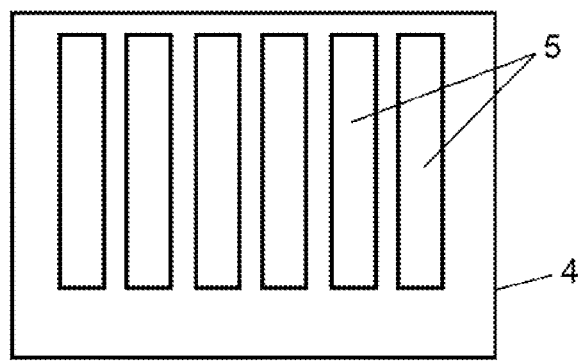
FIG. 9B is a plan view of the conventional touch panel.
Figure 9C:
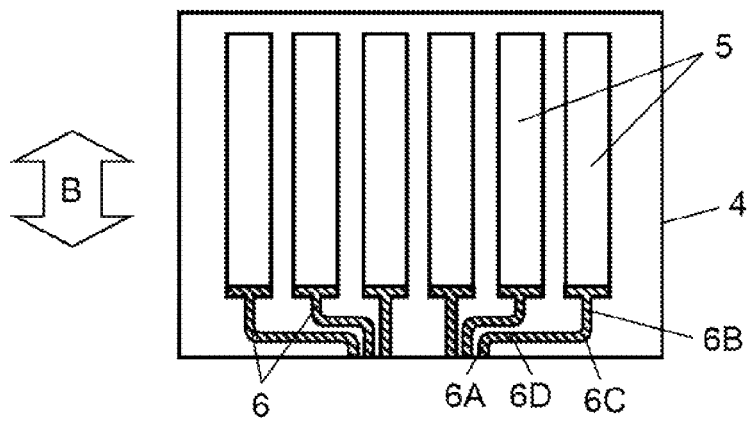
FIG. 9C is a plan view of the conventional touch panel.

FIG. 6 is an exploded perspective view of a touch panel according to the third exemplary embodiment of the present invention. In FIG. 6, touch panel 50 includes lower substrate 14 serving as the first substrate, upper substrate 11 serving as the second substrate, lower conductive layer 35 serving as the first conductive layer, upper conductive layer 32 serving as the second conductive layer, lower electrode 36 serving as the first electrode, upper electrode 33 serving as the second electrode, base substrate 37, base conductive layer 38, base electrode 39, and hard coat sheet 40.

Upper substrate 11 has a film shape and has a light transmitting property. Upper conductive layers 32 formed to a plurality of substantially strip forms coupled to substantially a rectangular form are formed at predetermined intervals on the upper surface of upper substrate 11. Upper conductive layers 32 are formed by coupling a substantially rectangular indium tin oxide, tin oxide, or the like and have a light transmitting property. The plurality of upper electrodes 33 each having the end extending to the front end of upper substrate 11 are arranged at the left end and the right end of the plurality of upper conductive layers 32.

Lower substrate 14 has a film shape and has a light transmitting property. Lower conductive layers 35 formed to a plurality of substantially strip forms coupled to substantially a rectangular form are arranged on the upper surface of lower substrate 14. Lower conductive layers 35 are coupled to substantially a rectangular form similar to upper conductive layers 32, and have a light transmitting property. Lower conductive layers 35 are formed at predetermined intervals in a direction orthogonal to upper conductive layer 32. A plurality of lower electrodes 36 each having the end extending to the front end of lower substrate 14 are arranged from the front end of lower conductive layer 35.

The plurality of upper electrodes 33 are configured by straight portions 33A and 33B serving as the second straight portions extending in parallel in a predetermined direction (front side in FIG. 6), and inclined portions 33C and 33D serving as the second inclined portions coupled by being inclined at a predetermined inclination angle such as an inclination angle of greater than or equal to 15 degrees with respect to the direction orthogonal to straight portions 33A, 33B. The plurality of lower electrodes 36 are also formed by straight portion 36 serving as the first straight portion extending in parallel in a predetermined direction (front side in FIG. 6), and inclined portions 36C serving as the first inclined portion coupled by being inclined at a predetermined inclination angle such as an inclination angle of greater than or equal to 15 degrees with respect to the direction orthogonal to straight portion 36A. The inclination angle of inclined portions 33C, 33D, and 36C is more preferably greater than or equal to 30 degrees. Inclined portion 33D coupled to straight portion 33A on the inner most side of upper electrode 33 is formed from upper conductive layer 32 made of indium tin oxide, tin oxide, and the like, and is formed in a fine patterned state of smaller than or equal to a predetermined width or gap.

Furthermore, base substrate 37 has a film shape and has a light transmitting property. Substantially rectangular shaped base conductive layer 38 having a light transmitting property made of indium tin oxide, tin oxide, and the like is formed on the upper surface of base substrate 37, and base electrode 39 having the end extending to the front end of base substrate 37 is arranged at the front end of base conductive layer 38.

Hard coat sheet 40 is a film having a light transmitting property, where acryl and the like are applied on the upper surface. Hard coat sheet 40, upper substrate 11, lower substrate 14, and base substrate 37 are laminated by an adhesive (not shown) in this order to configure the touch panel.

The plurality of upper conductive layers 32 and lower conductive layers 35 coupled to substantially a rectangular form alternately overlap orthogonally so as to fill the void between the respective substantially rectangular shapes, and are stacked so as to be positioned one above the other.

In this exemplary embodiment, the plurality of substantially strip-shaped upper conductive layers 32 coupled to substantially a rectangular form and the plurality of lower conductive layers 35 formed in the direction orthogonal thereto, as well as the plurality of lower conductive layers 35 and base conductive layer 38 are respectively formed to face each other across a predetermined gap through upper substrate 11 and lower substrate 14, respectively.

The touch panel configured in such a manner is arranged on the front surface of the display element such as a liquid crystal display element and attached to the electronic device, and the plurality of upper electrodes 33 and lower electrodes 36, and base electrode 39 are electrically connected to the electronic circuit (not shown) of the device.

In the above configuration, when the area of arrow E at the upper surface of hard coat sheet 40 is lightly touched with a finger or the like for contact operation according to the display of the display element at the rear surface of the touch panel with a predetermined voltage sequentially applied to base conductive layer 38, upper conductive layer 32, and lower conductive layer 35 from the electronic circuit, some of the charges of the touch panel are conducted to the relevant finger, and the capacitance of upper conductive layer 32 and lower conductive layer 35 at the operated area changes.

The position in the front and back direction and the left and right direction of arrow E is detected by the electronic circuit according to an arbitrary upper conductive layer 32A and lower conductive layer 35A in which the voltage changed by the capacitance, and switching of various functions of the device such as selection of the desired menu can be carried out.

That is, with respect to a so-called resistance film type of pressing and bending upper substrate 11 to bring upper conductive layer 12 or 22 into contact with lower conductive layer 15 and detect the operated position as in first and second exemplary embodiments, a so-called capacitance type touch panel in which the operated position is detected by the change in capacitance caused by the contact of the finger or the like is adopted in this exemplary embodiment.

Therefore, according to this exemplary embodiment, the plurality of upper conductive layers 32 and lower conductive layers 35 are formed of a substantially strip form coupled to substantially a rectangular form, and the plurality of upper electrodes 33 and lower electrodes 36 are formed of straight portions 33B and 36B extending in parallel in a predetermined direction and inclined portions 33C and 36C coupled by being inclined at a predetermined inclination angle with respect to the direction orthogonal thereto, so that fading, thickness variation and the like can be prevented and fine patterning can be easily carried out, whereby an inexpensive capacitance type touch panel in which the overall miniaturization can be achieved can be obtained.

Inclined portion 33D coupled to straight portion 33A on the inner most side of upper electrode 33 is formed by upper conductive layer 32, so that the gap with other inclined portion 33C can be reduced and fine patterning can be easily carried out, similar to the second exemplary embodiment.

In this exemplary embodiment and the first exemplary embodiment as well, inclined portions 33C, 36C, and 16D of upper electrode 33 and lower electrodes 36 and 16 can be formed from upper conductive layer 32 and lower conductive layers 35, 15, as described in the second exemplary embodiment, so that upper electrode 33 and lower electrodes 36, 16 can be formed in a state without fading, thickness variation and the like at the time of printing even if the inclination angle of inclined portions 33C and 36C, 16D with respect to the direction orthogonal to straight portions 33B and 36B is slightly small.

The touch panel according to the present invention has an advantageous effect in that fine patterning and miniaturization can be easily achieved and various operations can be realized, and is mainly useful for operating various types of electronic devices.

The invention claimed is:

1. A touch panel comprising:
   a first substrate;
   a light transmitting first conductive layer formed on one surface of the first substrate;
   a second substrate;
   a light transmitting second conductive layer formed on a surface of the second substrate facing the first conductive layer;
   a plurality of first electrodes extending from the first conductive layer on the first substrate; and
   a plurality of second electrodes extending from the second conductive layer on the second substrate;
   wherein the first conductive layer is formed of a plurality of parallel strips, the first conductive layer being formed of a first material;
   wherein each of the plurality of first electrodes is formed of
      a screen-printed first straight portion extending in a predetermined direction and being formed of a second material different than the first material, and
      a sputtered first inclined portion coupled to the first straight portion and being inclined by a predetermined angle with respect to a direction orthogonal to the first straight portion;
   wherein at least one of the first inclined portions is formed of the first material;
   wherein the light transmitting second conductive layer is formed of a third material; and
   wherein at least portions of the second electrodes are formed of a fourth material different than the third material,
   wherein the first material and the third material are indium tin oxide or tin oxide, and the second material and the fourth material are silver or carbon.

2. The touch panel according to claim 1, wherein
   the second conductive layer is formed of a plurality of parallel strips; and
   each of the plurality of second electrodes is formed of
      a second straight portion extending in a predetermined direction, and
      a second inclined portion coupled to the second straight portion and being inclined by a predetermined angle with respect to a direction orthogonal to the second straight portion.

3. The touch panel according to claim 2, wherein the strips of the second conductive layer are formed to extend orthogonal to the strips of the first conductive layer.

4. The touch panel according to claim 2, wherein, for each of the second electrodes, the second straight portion is extended in a direction orthogonal to the strips of the second conductive layer.

5. The touch panel according to claim 2, wherein
   at least one of the second inclined portions is formed of the third material.

6. The touch panel according to claim 5 further comprising:
   a substantially frame shaped spacer interposed between the first substrate and second substrate and being disposed on inner edges of outer peripheries of the first substrate and the second substrate,
   wherein at least one of the second inclined portions formed of the third material is formed on an inner side of an inner periphery of the spacer.

7. The touch panel according to claim 6, wherein at least one of the first inclined portions formed of the first material is formed on the inner side of the inner periphery of the spacer.

8. The touch panel according to claim 1, wherein the predetermined angle is from 15 degrees to 75 degrees.

9. The touch panel according to claim 1, wherein, for each of the first electrodes, the first straight portion is extended in a direction parallel to the strips of the first conductive layer.

10. The touch panel according to claim 1 further comprising:
    a substantially frame shaped spacer interposed between the first substrate and second substrate and being disposed on inner edges of outer peripheries of the first substrate and the second substrate,
    wherein at least one of the first inclined portions formed of the first material is formed on an inner side of an inner periphery of the spacer.

11. The touch panel according to claim 1, wherein all of the first inclined portions are formed of the first material.

12. A touch panel comprising:
    a first substrate;
    a first conductive layer formed on one surface of the first substrate;
    a second substrate;
    a second conductive layer formed on a surface of the second substrate facing the first conductive layer;
    a substantially frame shaped spacer interposed between the first substrate and the second substrate and disposed on inner edges of outer peripheries of the first and second substrates;
    a plurality of first electrodes extending from the first conductive layer; and
    a plurality of second electrodes extending from the second conductive layer;
    wherein the first conductive layer is formed of a plurality of parallel strips;

wherein each of the plurality of the first electrodes is formed of
a screen-printed first straight portion extending in a first predetermined direction, and
a sputtered first inclined portion coupled to the first straight portion and being inclined by a predetermined angle with respect to a direction orthogonal to the first straight portion;
wherein the second conductive layer is formed of a plurality of parallel strips; and
wherein each of the plurality of the second electrodes is formed of
a second straight portion extending in a predetermined direction, and
a second inclined portion coupled to the second straight portion and being inclined by a predetermined angle with respect to a direction orthogonal to the second straight portion, wherein the first conductive layer, the second conductive layer, and parts of the first inclined portion and the second inclined portion formed on an inner side of an inner periphery of the spacer are made of indium tin oxide or tin oxide, and the first straight portion, the second straight portion, and parts of the first inclined portion and the second inclined portion formed on an outer side of the inner periphery of the spacer are made of screen-printed silver or carbon.

* * * * *